United States Patent [19]
Lee et al.

[11] Patent Number: 5,150,405
[45] Date of Patent: Sep. 22, 1992

[54] DUPLEX STRUCTURE SIGNAL TRANSFER POINT SYSTEM FOR COMMON CHANNEL SIGNALLING SYSTEM NO. 7

[75] Inventors: Young H. Lee; Young S. Baek; Seok G. Lee; Kun W. Lee; Jong E. Chae; Hyun T. Lee, all of Daejeon, Rep. of Korea

[73] Assignees: Electronics and Telecommunications Research Institute, Daejeon; Korea Telecommunication Authority, Seoul, both of Rep. of Korea

[21] Appl. No.: 585,994

[22] Filed: Sep. 21, 1990

[30] Foreign Application Priority Data

Sep. 23, 1989 [KR] Rep. of Korea ............... 1989-13721

[51] Int. Cl.$^5$ ...................... H04M 7/06; H04Q 11/04
[52] U.S. Cl. ............................... 379/230; 370/110.1; 379/269
[58] Field of Search ............ 379/230, 279, 269, 284, 379/229; 370/110.1

[56] References Cited
U.S. PATENT DOCUMENTS 4,499,336  2/1985  Krikor et al. ................. 379/230
4,914,572  4/1990  Bitzinger et al. ............. 364/200
5,018,059  5/1991  Kerschner et al. ............ 364/200

OTHER PUBLICATIONS

"CCITT Signaling System No. 7 in AXE10", Rietz et al., *Ericsson Review*, No. 2, 1982, pp. 100–105.
"Introduction of CCITT No. 7 Signaling System into French Exchanges", Collet et al., *Commutation & Transmission* No. 3-1983, pp. 5–24.
"An Overview of Signaling System No. 7", G. Schlanger, *IEEE Jour. on Selected Areas to Communications*, vol. SAG4, No. 3, May 1986, pp. 360–365.

*Primary Examiner*—Thomas W. Brown
*Attorney, Agent, or Firm*—Blakely, Sokoloff, Taylor & Zafman

[57] ABSTRACT

The present invention provides a duplex structure signal transfer point system for common channel signaling system No. 7, which includes a serial duplexed interconnection device; a duplexed network interface connected to the serial duplexed interconnection device, for performing an interconnection between signal message processing submodules; a parallel duplexed interconnection device connected to the duplexed network interface, for performing a parallel duplexed interconnection between unit level 2s and a duplexed unit level 3, wherein the duplexed unit level 3 is connected to the parallel duplexed interconnection device, for performing a protocol level 3 of a message transfer protocol in the common channel signalling system No. 7; and wherein the unit level 2s are connected to the parallel duplexed interconnection device, for performing a protocol level 2 of the message transfer protocol in the common channel signalling system No. 7.

6 Claims, 10 Drawing Sheets

DUPLEX STRUCTURE SIGNAL TRANSFER POINT SYSTEM FOR COMMON CHANNEL SIGNALLING SYSTEM NO. 7

BACKGROUND OF THE INVENTION

The present invention pertains to a duplex structure signal transfer point system for common channel signalling system No. 7 suggested by CCITT (International Telegraph and Telephone Consultative Committee).

Unit level 2, one of the units which accept protocol for message transfer, is a board that runs protocol level 2 of the message transfer part protocol. Unit level 3 is a board that runs message handling protocol, which governs message routing in protocol level 3 of the message transfer protocol. Network level 2—3 interconnects the units such as a unit level 3, a network unit level 3—3, and many unit level 2's And a signal message processing sub-module, comprising the unit level 3, the unit level 2, and the network unit level 3—3, is constructed by interconnection of each unit with a network unit 2—3.

In prior art signal transfer point systems, a network level 2—3 with only one path is used for the interconnection between the unit level 3 and the unit level 2's. Also, a network level 3—3 with one path is used for the interconnection between such modules. In cases a path is malfunctioning, many unit level 2's or modules are disabled given that there's just one path in such a system.

SUMMARY OF THE INVENTION

It is an object to improve the reliability of the system by replacement of the malfunctioning module following appropriate procedures.

To achieve the above-mentioned object, the present invention provides a duplex structure signal transfer point system for common channel signalling system No. 7, comprising (1) a duplex structure network level 3—3, (2) a network unit level 3—3 interconnected to the duplex structure network level 3—3, a unit level 2, and a unit level 3, (3) a signal message processing module with duplex structure network level 2—3, interconnecting the unit level 3, the unit level 2, and the network unit level 3—3, (4) a management module connected to the duplex structure network level 3—3, and (5) an O & M (Operation and Maintenance) system connected to the duplex structure network level 3—3.

BRIEF DESCRIPTION OF THE DRAWINGS

This invention will be readily understood from the following more detailed description presented in conjuction with the following drawings, in which.

DETAILED DESCRIPTION OF THE DRAWINGS

With reference to the drawings, the present invention will be described in detail.

Figure 1:
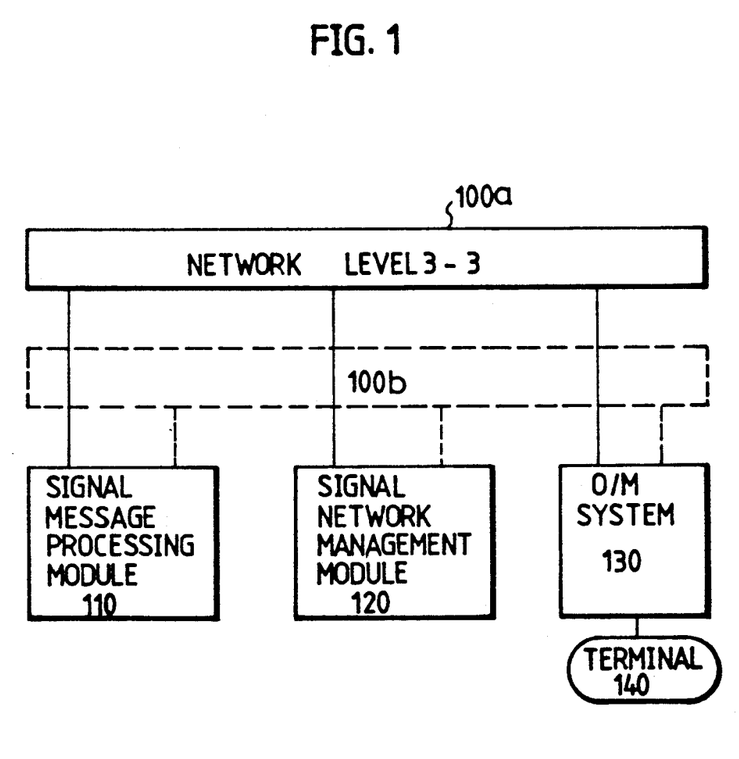
FIG. 1 is a diagram showing a duplex structure signal transfer point system of the present invention.

FIG. 1 shows a signal transfer point system with duplex structure network level 3—3, comprising (1) network level 3—3's 100a and 100b, (2) a signal message processing module 110, (3) a signal network management module 120, (4) an O & M (Operation & Maintenance) system 130, and (5) a terminal 140.

Figure 2:
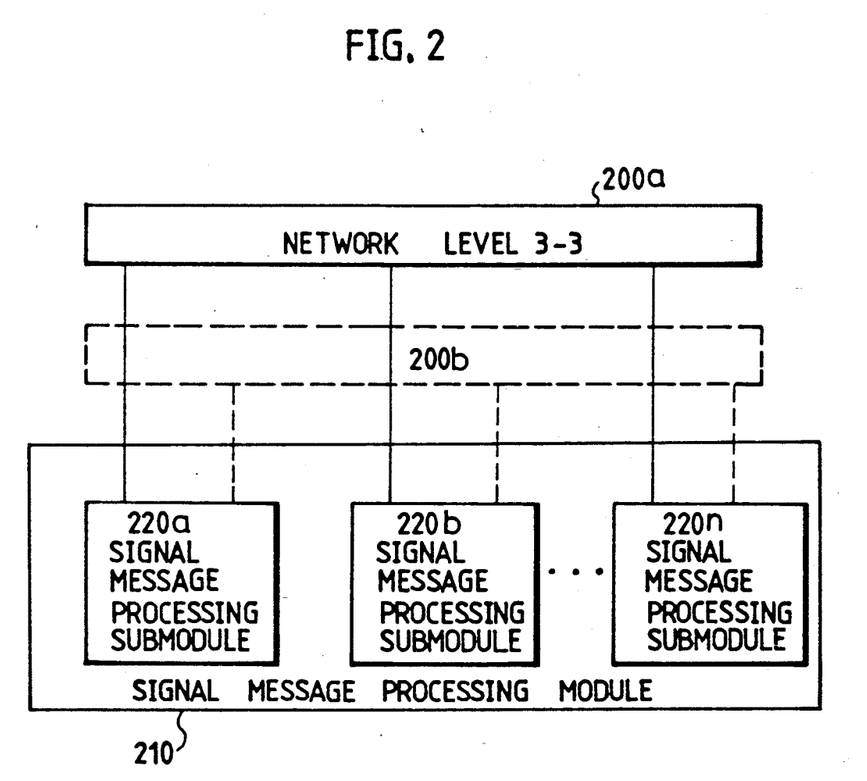
FIG. 2 is a diagram showing duplex structure signal message process module of the present invention.

FIG. 2 shows a duplex structure signal message processing module of the present invention, comprising (1) network level 3—3's 200a and 200b, (2) a signal message processing sub-modules 220a through 220n.

Figure 3:
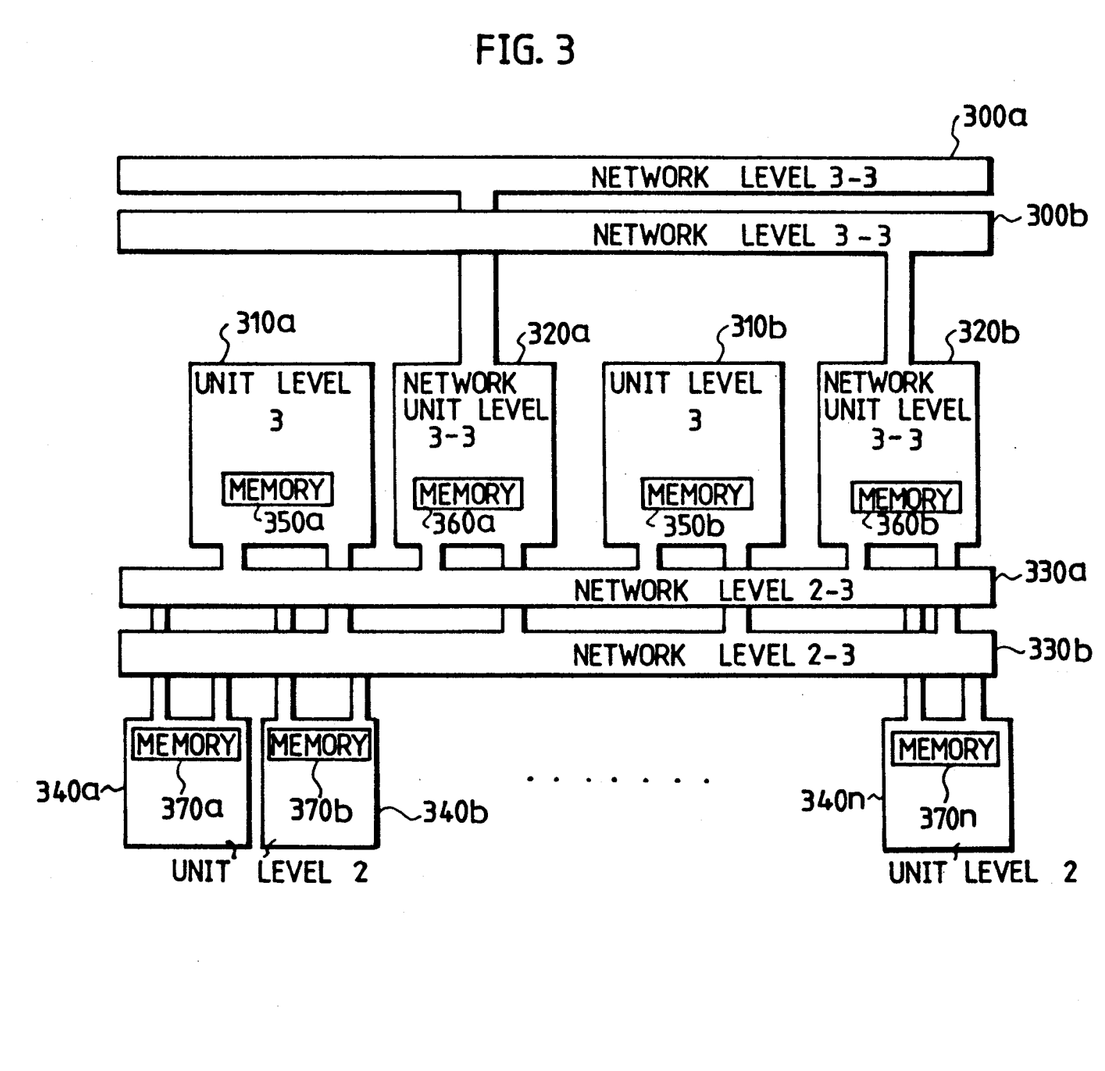
FIG. 3 is a diagram showing duplex structure signal message process sub-modules of the present invention.

FIG. 3 shows a duplex structure signal message processing sub-module, comprising (1) network level 3—3's 300a and 300b, (2) unit level 3's 310a and 310b, (3) network unit level 3—3 320a and 320b, (4) parallel buses or network level 2—3's 330a and 330b, (5) unit level 2's 340a through 340n, (6) distributive memories 350a and 350b in the unit level 3, (7) distributive memories 360a and 360b in the network unit level 3—3, and (8) distributive memories 370a through 370n in the unit level 2.

In the context of signalling system no. 7, network level 2—3 connects the unit level 2's to the unit level 3's. Network level 3—3 is connected to network level 2—3 through network interface network level 3—3, thus allowing for the interconnection of the signal message processing module to the signal network management module and to the operation and maintenance system of FIG. 1.

In the present invention, the system is duplexed, i.e., the signals have more than one interconnection path over which to travel, unlike the prior art. The use of more than one path provides for greater reliability in case a path malfunctions in the signal transfer point system.

Thus, in the present invention, the signal message processing submodule consists of two separate boards, the network unit level 3—3's 320a and 320b, for the interconnection between the duplex structure network level 3—3's 300a and 300b.

In other words, the network unit level 3—3's act as an interface for the network level 3—3 serial interconnection network. In this way, the reliability of the system is improved because the disable state of a signal message processing submodule is prevented by the utilization of the network unit level 3—3's and the parallel buses. Especially, the unit level 3's 310a and 310b are interconnected to numerous unit level 2's, 340a through 340n, by two parallel buses, 330a and 330b, represent the parallel interconnection network level 2—3. In case an error occurs in a parallel bus of such a system, the disable states of numerous unit level 2's, caused by the error on the parallel bus, are prevented by the interconnection between the unit level 2 and the unit level 3 through the parallel bus with no error. As a result, the reliability of the system is improved, and the system normally operates during maintenance. Two boards of the unit level 3 can simultaneously do either the same functions or different functions. The unit level 3 acts as master of each parallel bus. Therefore, the unit level 3, connected to the parallel bus with no error, acts as master when an error occurs in a parallel bus.

The signal message processing module includes hundreds of signal links, running the functions of level 2. For each signal link, a board of unit level 2 is required. Therefore, the signal message processing module is equipped with hundreds of unit level 2 boards. But said hundreds of unit level 2 boards cannot be connected to one parallel bus. In consequence, the present invention adopts a hierarchical structure connecting numerous signal message processing sub-modules, each of them interconnecting 8 through 16 unit level 2's through the parallel bus, by using of the duplex structure network level 3—3, Then, hundreds of circuit boards can be connected to the parallel bus with ease.

In general, signaling system no. 7 includes a signal transfer point system ("STP") for transmitting a signaling signal between exchanges. The STP includes unit level 2's (which are connected to the physical signaling data link), unit level 3's and interface units. The message routing between exchanges is controlled by the programming of the CPU of unit level 3.

Figure 4:
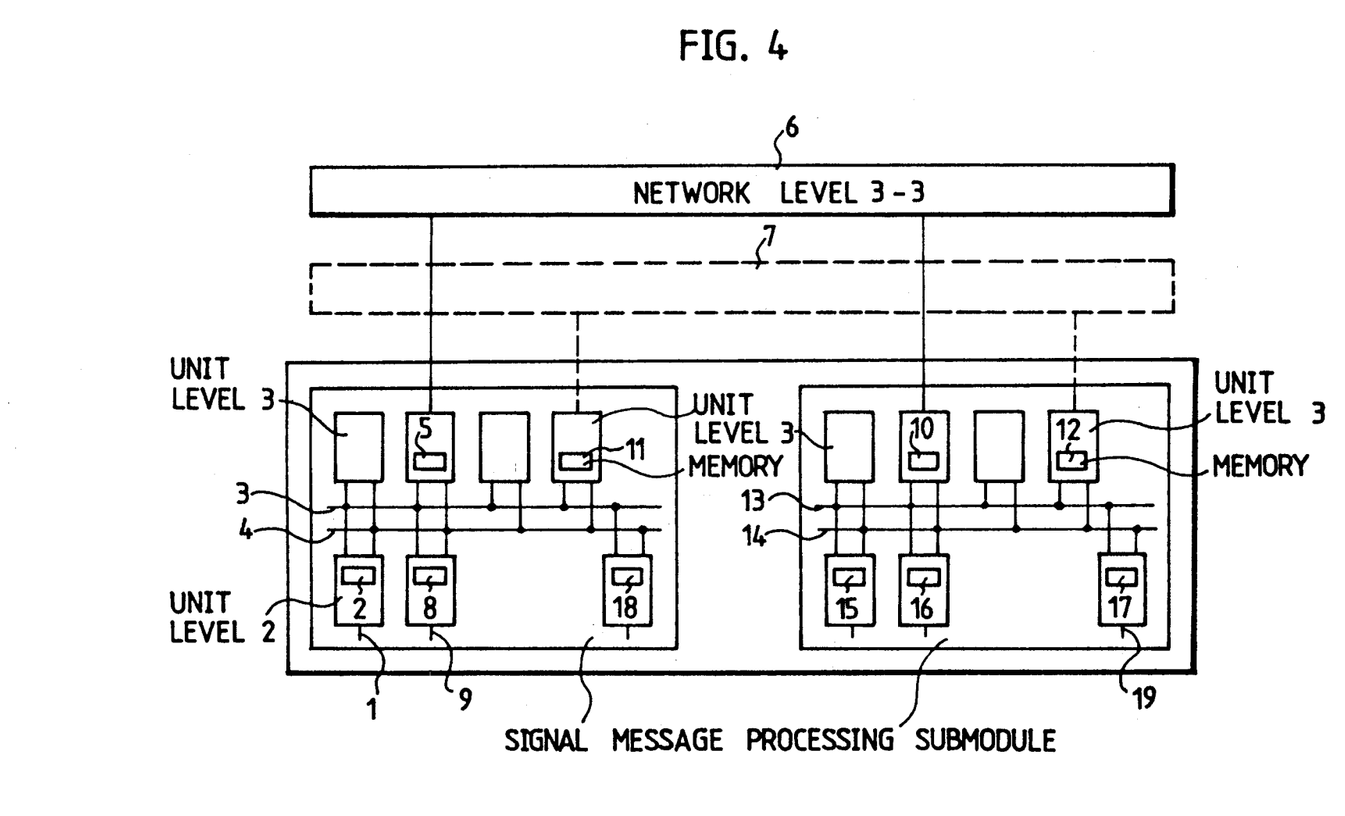
FIG. 4 is a diagram illustrating the flow of input signal messages applied to unit level 2.

FIG. 4 shows illustrates the flow of signal messages applied to the unit level 2. For example, signal message stream 1 and stream 2 illustrate the signal message process in its normal state. The stream 1 flowing in the order of 1-2-3-8-9 shows a process, in which a signal message processed in the unit level 3 is applied to the unit level 2 in the same signal message processing sub-module. The stream 2 flowing in the order of 1-2-3-5--6-10-17-19 shows a process, in which a signal message processed in the unit level 3 is applied to the unit level 2 in the same signal message processing sub-module. The stream 3 flowing in the order of 1-2-4-8-9 shows a process, in which the signal message is transferred through the other parallel bus with no error, when one parallel bus is malfunctioning. The stream 4 flowing in the order of 1-2-3-11-7-12-17-19 shows a process, in which the signal message is processed through the network level 3—3 and the network unit level 3—3, when one network unit level 3—3 or one network level 3—3 is malfunctioning.

Figure 5A:
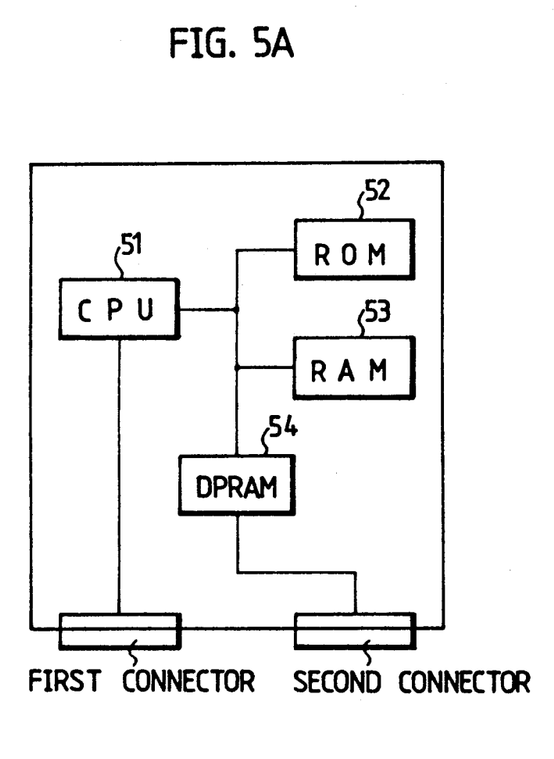
FIG. 5A is a diagram of an embodiment of unit level 3.
Figure 5B:
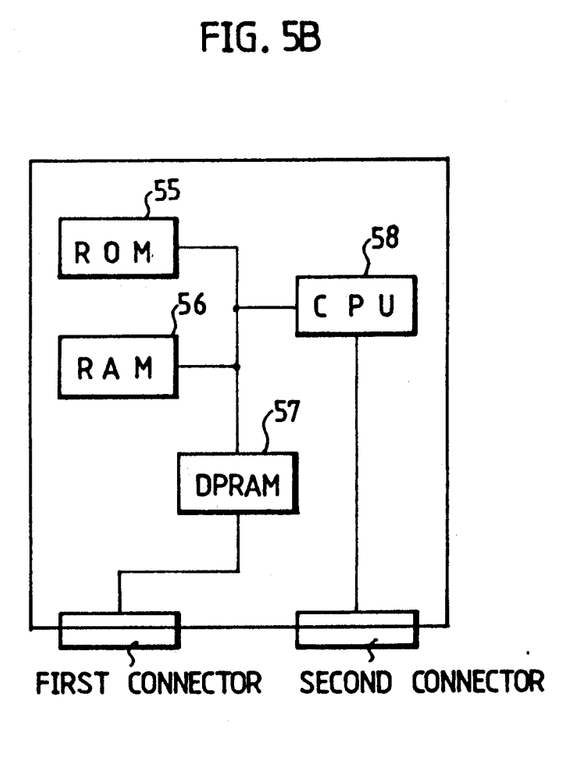
FIG. 5B is a diagram of another embodiment of unit level 3.

FIG. 5A and FIG. 5B show construction diagrams of the unit level 3, which perform the functions described in the protocol level 3 of the message transfer part protocol, comprising a CPU (Central Processing Unit), a ROM (Read Only Memory), a RAM (Random Access Memory), and a DPRAM (Dual Ported Random Access Memory).

The unit level 3 can be made of a general-purpose processor, such as MC68000, Intel 80286, and so on, and a ROM or a RAM storing programs, performing the functions described in the level 3 of the message transfer part protocol. The unit level 3 is interconnected to the duplex structure parallel bus through first connector and second connector. There are two kinds of unit level 3. In one of the two kinds of unit level 3 shown in the FIG. 5A, the CPU accesses one portion of the duplex structure parallel bus through the first connector, and also accesses the other portion of the duplex structure parallel bus through the DPRAM and the second connector. The latter access performs memory functions only. In the other unit level 3 shown in FIG. 5B, the CPU accesses one portion of the duplex structure parallel bus through the second connector, and also accesses the other portion of the duplex structure parallel bus through the DPRAM and the first connector. The latter access performs memory functions only. Given that the above-mentioned two kinds of unit level 3 directly access one portion of the duplex structure parallel bus without any bus arbiter, the performance of the system is improved for high speed access to the parallel bus is possible. As a result, every unit level 3 is regarded as a memory to each other.

Therefore, the performance of the system is improved and the hardware of the system is simplified, because bus arbitration time can be excluded in unit level 3 construction of the system. Since the design of a duplex structure bus arbiter is technologically difficult, the exception of the arbiter in the system takes great advantage. By replacing the erroneous unit level 3 with the normal unit level 3, the disable states of numerous unit level 2's connected to the unit level 3 are prevented.

Figure 6:
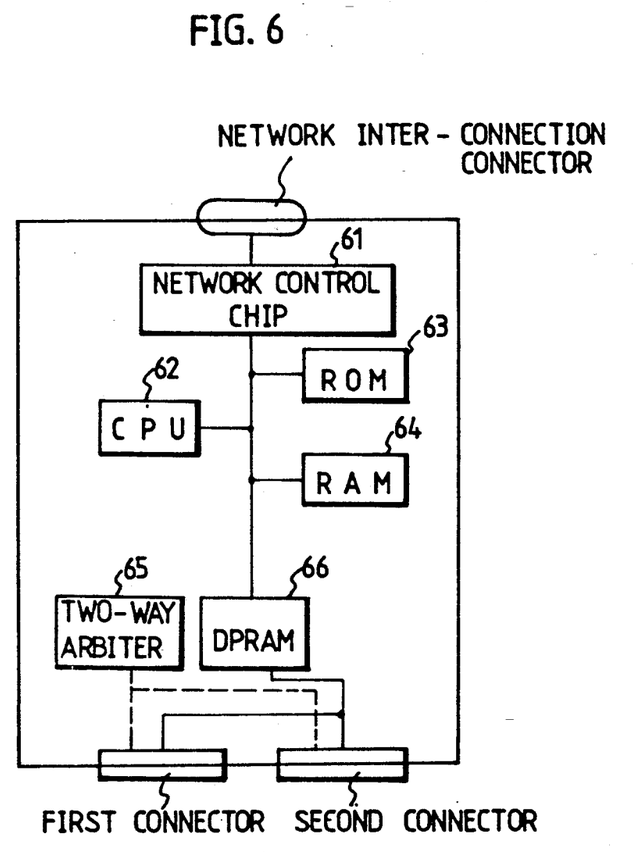
FIG. 6 is a diagram showing construction of interconnection network unit level 3—3.

FIG. 6 is a construction diagram of the network unit 3—3 comprising a CPU, a RAM, a ROM, a DPRAM, a network control chip, and an arbiter.

The network unit level 3—3, comprising a general-purpose processor and memory devices, interconnects the module or the submodule to the network level 3—3. Specifically, a network control chip is used for interfacing the network level 3—3.

In general, a network control chip is used for communication between a system and a popular LAN (Local Area Network), such as Token Ring, Token Bus, and Ethernet. Programs for driving the network control chip and of the network level 3—3 control protocol, are stored in ROM and RAM. As shown in FIG. 6, the unit level 3 interacts with the network unit level 3—3's as if they were memory devices. An internal two-way arbiter is required to prevent the access to the memory through both the first connector and the second connector at the same time. Given that the two-way arbiter independently exists in the circuit board, unlike the bus arbiter for the bus, an erroneous two-way arbiter doesn't seriously affect the entire system.

Figure 7:
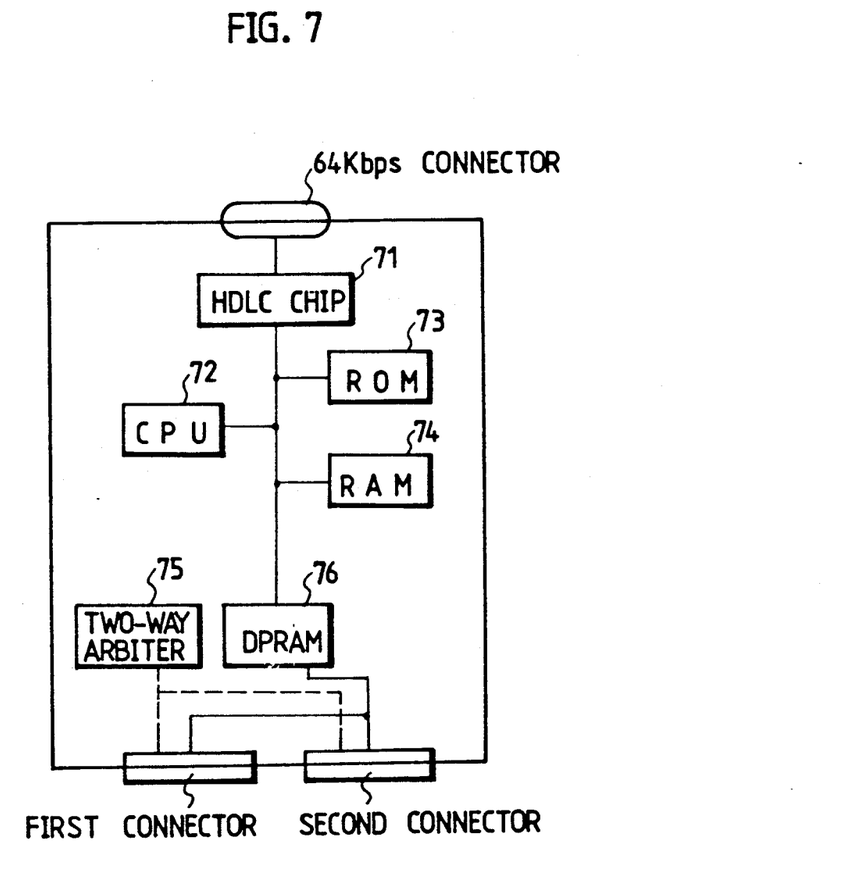
FIG. 7 is a diagram showing construction of unit level 2.

FIG. 7 shows a construction diagram of the unit level 2, comprising a CPU 72, a RAM 74, a ROM 73, a DPRAM 76, a HDLC chip 71, and an arbiter 75. The unit level 2 performs the protocol level 2 of message transfer part protocol. The protocol level 3 is related to the functions for the network management and the signal message routing. Likewise, the unit level 2 performs the signal message transfer function. In other words, it transfers corrected signal message for error-free signal message transfer. The signal message transfer speed is 64Kbps. The unit level 2 performs the protocol level 2 by using of commerical HDLC chip 71, such as Z8530, SCN68562, and so on. As shown in FIG. 7, the unit level 3 interacts with the unit level 2's as if they were memory devices, like the network unit level 3—3's above. An internal two-way arbiter 75 is required to prevent the access to the memory through both the first connector and the second connector at the same time. Given that the two-way arbiter 75 independently exists in the circuit board, unlike the bus arbiter for the bus, an erroneous two-way arbiter doesn't seriously affect the entire system, like in FIG. 6.

As shown in FIG. 5, FIG. 6, and FIG. 7, no bus arbiter is required, because each bus of the duplex structrue parallel bus accesses only one unit level 3. In other words, the circuit is greatly simplified for every unit in the system is interacted with as if it were a memory device, and the duplication is easily done for no arbiter is required. And commercial DPRAM's are used as RAM's connected to the parallel bus, for the simplification of the functions of RAM arbiter (101 and 103, shown in FIG. 10) on the board.

Figure 8:
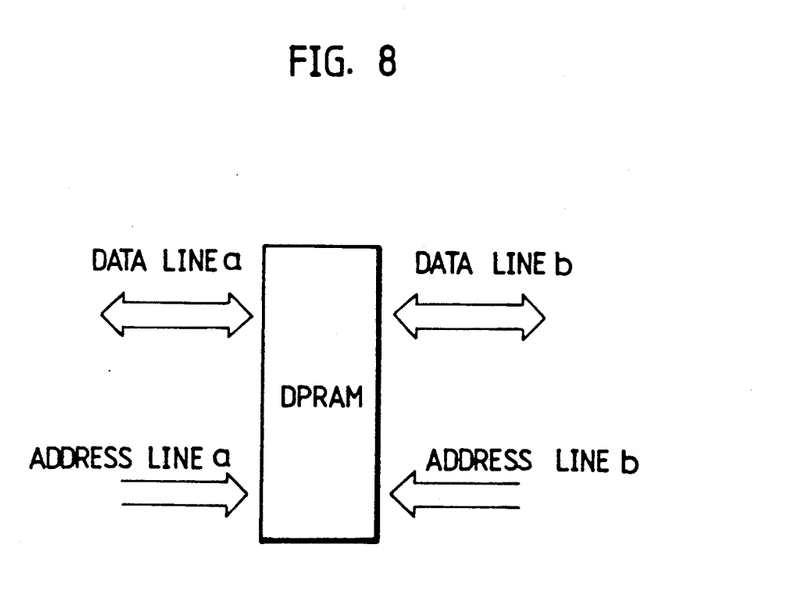
FIG. 8 is a diagram showing a common DPRAM (Dual Ported Random Access Memory)

FIG. 8 shows a block diagram of a commercial DPRAM, no RAM arbiter is required when the CPU inside the unit accesses the parallel bus through the first connector and the second connector, given that the DPRAM has independent address lines and independent data lines unlike a typical RAM.

In this way, the performance of the system is greatly improved by reduction of the time required for the RAM arbitration. Specifically, the performance of the system is also greatly improved by reduction of the time required for the arbitration for the unit level 3 with DPRAM.

Figure 9:
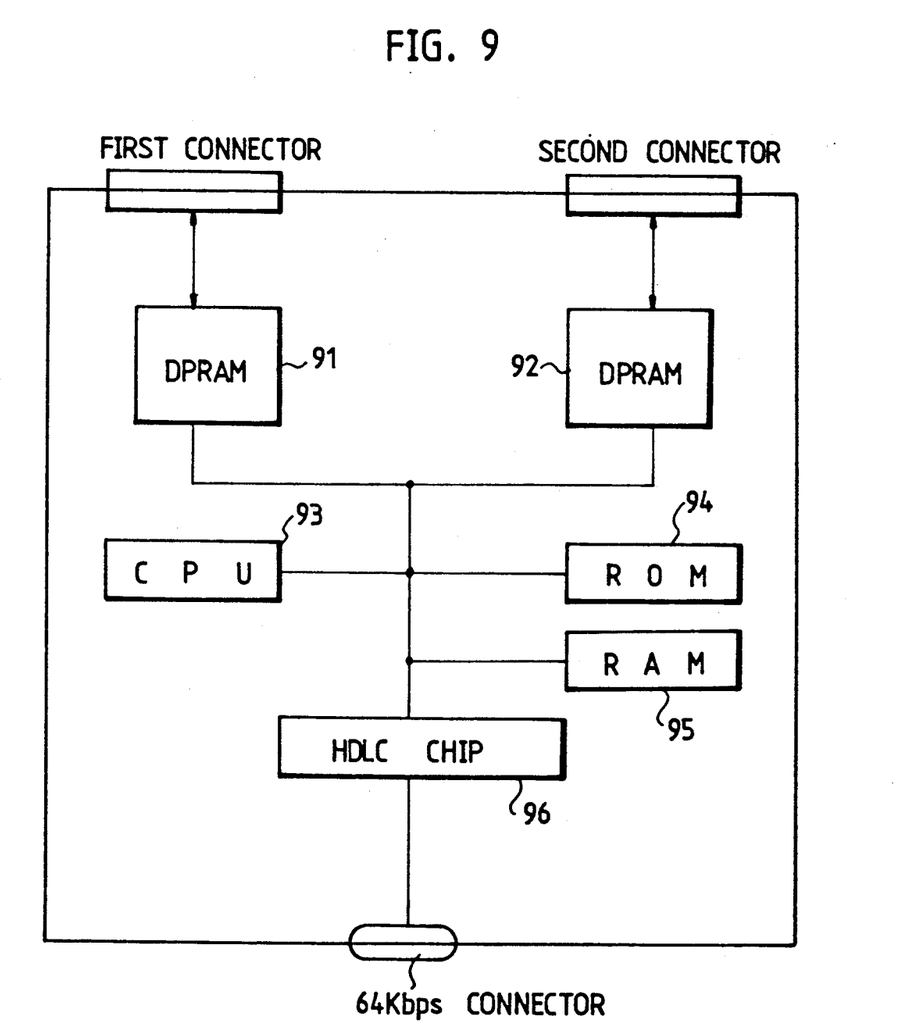
FIG. 9 is a diagram showing detailed construction of another embodiment of unit level 2.

FIG. 9 shows construction of another embodiment for the unit level 2, comprising two DPRAM's 91 and 92, a CPU 93, a ROM 94, a RAM 95, and a HDLC chip 96, without the need for a two-way arbiter.

The functions of the above construction elements are like the unit level 2 of FIG. 7.

Figure 10:
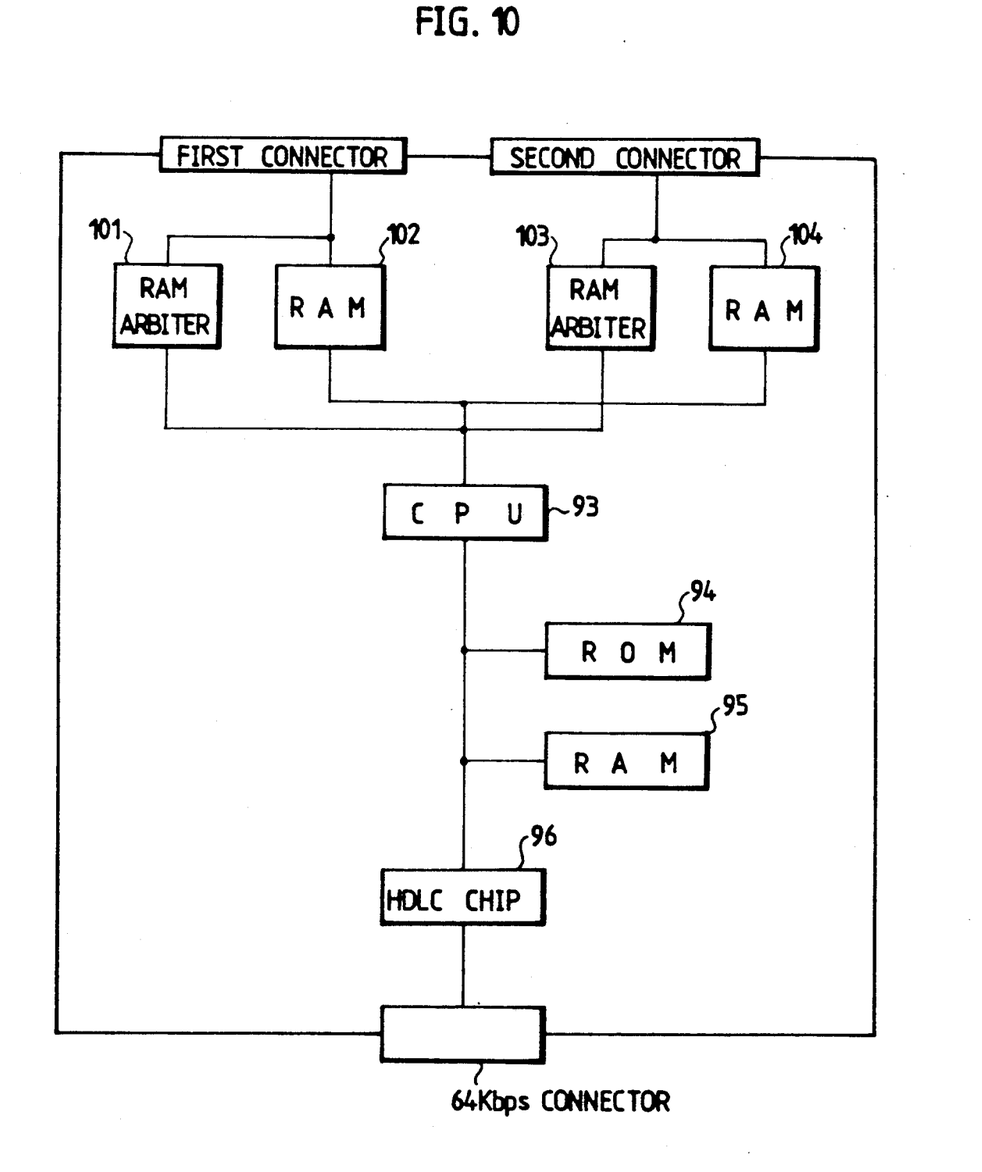
FIG. 10 is a diagram showing detailed construction of another embodiment of unit level 2.

FIG. 10 shows construction of another embodiment for the unit level 2, comprising two RAM's 102 and 104 and two RAM arbiters 101 and 103, a CPU 93, a ROM 94, a RAM 95, and a HDLC chip 96. The RAM's 102 and 104 and the arbiter 101 and 103 respectively first or second connector and the CPU 93.

The functions of the above construction elements are like the unit level 2 of FIG. 7.

The advantages provided by the present invention will be described hereinafter.

Even though there occurs an error in the network level 2—3 or the network level 3—3, numerous unit level 2's and modules can normally operate. Extra time required for the maintenance of the erroneous path can be provided by replacement of the path with the other path of normal condition. In the prior art system, the entire system should be shut down, or there are so many troubles to bear for replacement of a module in the system. However, in the system of the present invention, the erroneous module can be replaced without causing turbulence in the operation of the system.

What is claimed is:

1. A duplex structure signal transfer point system for common channel signalling system No. 7, comprising:
    serial duplexed interconnection means;
    duplexed network interface means connected to said serial duplexed interconnection means, for performing an interconnection between a plurality of signal message processing submodules;
    parallel duplexed interconnection means connected to said duplexed network interface means, for performing a parallel duplexed interconnection between a plurality of unit level 2 performing means and a duplexed unit level 3 performing means;
    said duplexed unit level 3 performing means connected to said parallel duplexed interconnection means, for performing a protocol level 3 of a message transfer protocol in the common channel signalling system No. 7; and
    said plurality of unit level 2 performing means connected to said parallel duplexed interconnection means, for performing a protocol level 2 of the message transfer protocol in the common channel signalling system No. 7.

2. A duplex structure signal transfer point system according to claim 1, said serial duplexed interconnection means, said duplexed unit level 3 performing means, and said plurality of unit level 2 performing means respectively including a memory for sending and receiving messages to and from said duplexed unit level 3 performing means.

3. A duplex structure signal transfer point system according to claim 1, said parallel duplexed interconnection means comprising two parallel buses.

4. A duplex structure signal transfer point system according to claim 3, said duplexed unit level 3 performing means comprising a CPU, a ROM and a RAM connected to said CPU, and a DPRAM (Dual Ported RAM).

5. A duplex structure signal transfer point system according to claim 4, said duplexed network interface means comprising a CPU, a network control chip, a ROM and a RAM connected to said CPU and said network control chip, and a DPRAM connected to said CPU, said network control chip, said ROM and said RAM.

6. A duplex structure signal transfer point system according to claim 5, the unit level 2 performing means including two arbiters and two RAM's.

* * * * *